Feb. 25, 1941.  E. G. SIMPSON ET AL  2,232,810

WINDOW GLASS RUN CHANNEL ASSEMBLY

Filed June 13, 1938

INVENTOR.S
Emory Glenn Simpson
James L. Conlon
BY Barnes, Kisselle, Laughlin & Raisch
ATTORNEY.S Patented Feb. 25, 1941

2,232,810

UNITED STATES PATENT OFFICE 2,232,810

WINDOW GLASS RUN CHANNEL ASSEMBLY

Emory Glenn Simpson and James L. Conlon, Detroit, Mich., assignors to General Motors Corporation, Detroit, Mich., a corporation of Delaware Application June 13, 1938, Serial No. 213,394

2 Claims. (Cl. 296—44)

This invention relates to a window glass run channel assembly and more particularly to a window guide channel assembly for an automotive vehicle.

Heretofore it has been customary to secure the glass run channel in the window opening by passing driving screws through the bottom wall of the channel. The tendency to increase the range of visibility of the driver has caused the door pillars in particular to be narrowed considerably. This thinning down of the door pillar sections has appreciably decreased the available space between the base of the rabbet in which the window glass run channel fits and the outside wall of the pillar and practically precludes fastening the window guide channel in the window opening by passing drive screws through the base of the channel.

It is the object of this invention to produce a window glass run channel assembly which overcomes the above difficulties and is readily assembled in the window opening irrespective of the thinness of the door pillar or header section.

It is also an object of this invention to produce a window glass run channel which can be easily inserted and locked in place in the window opening.

Figure 1:
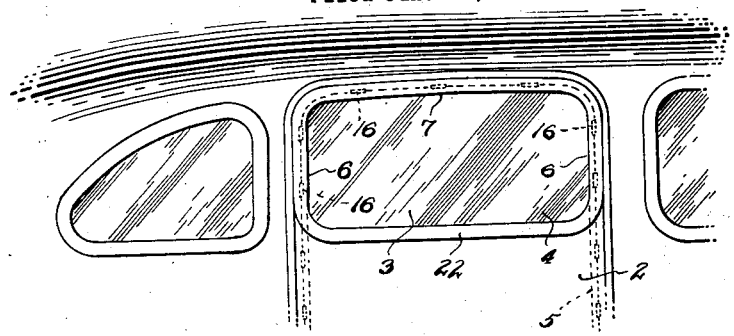
Fig. 1 is a fragmentary elevation of a side wall of a vehicle body illustrating the position of the window glass run channel in the window opening.

Referring more particularly to the drawing there is shown a portion of an automotive vehicle body having a door 2 and window opening 3 which is closed by the usual sliding glass panel 4. The window glass 4 is guided in any suitable window glass run. For purposes of description rather than by way of limitation, a commonly used form of window glass run is illustrated. This glass run consists of a metal channel 5 in the form of a U which extends along the side edges 6 and the top edge 7 of the window opening. The metal channel 5 is provided with a cushion insert 8 of pile fabric which slidably receives and cushions the window panel 4 along its top and side edges.

The window opening 3 is defined on the outside by the reveal 9 of an outside metal body panel 10 which, in this instance is the outside door panel. The reveal 9 is provided with a rabbet 11 which extends throughout the top and side vertical edges of the window 3. The inner metal panel of the door is referenced 12 and is welded to the outer panel 10. It will be noted that the rabbet comprises an outer wall 13 and a side wall 14. The outer wall 13 is provided with a plurality of spaced openings 15 along the top and side vertical edges of the window opening 3.

For securing the glass run in the rabbet 11, a plurality of clips 16 are secured to the base 17 of the channel 5. A pair of lugs 18 are struck out of the base of the clip. In assembly these lugs 18 are projected through openings 23 in the base of the glass run channel 5 and then bent over the base of the glass run channel which secures the clip to the channel. The clips 16 are spaced along the top and side portions of the window glass run channels and correspond in number to the number of openings 15 in the wall 13. The clips 16 are preferably made of a spring metal, such as steel, and provided with a return bend portion 19 which terminate in a hook portion 20.

After the clips 16 have been secured to the base of the window glass run channel, the channel is inserted in the window opening and the clips 16 projected into the slots 15. The window glass run channel is then moved in a direction toward the outside of the body, that is, toward the right, as viewed in Figs. 2, 3 and 4, which causes the clip finger portions 19 to be sprung back by the lower edge 21 of the slots 15 until the hook portion 20 reaches the slot 15. At this time the hook snaps over the inner edge 21 of the opening 15 and locks the window guide channel in place. Thereafter the garnish molding 22 is assembled in the window opening against the inner wall of the glass run in the usual manner and the window glass 4 can now be raised to close the window opening and will be cushioned and sealed by the glass run channel as shown.

Figure 2:
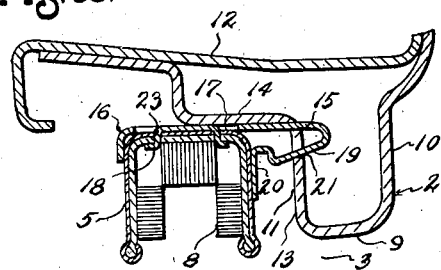
Figs. 2, 3 and 4 are sectional views through the door header rail illustrating the assembly of the window guide channel in the window opening.
Figure 3:
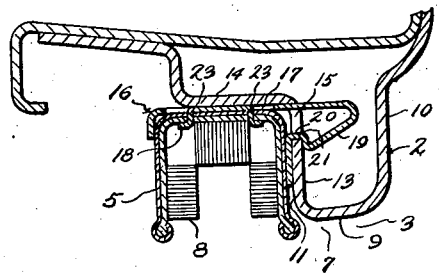
Figure 4:
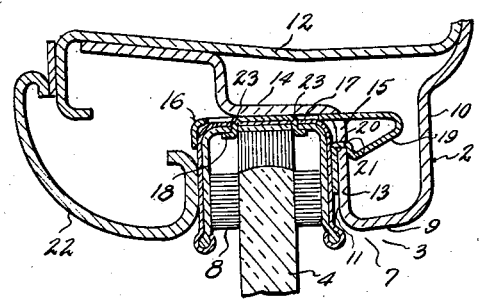
Figure 6:
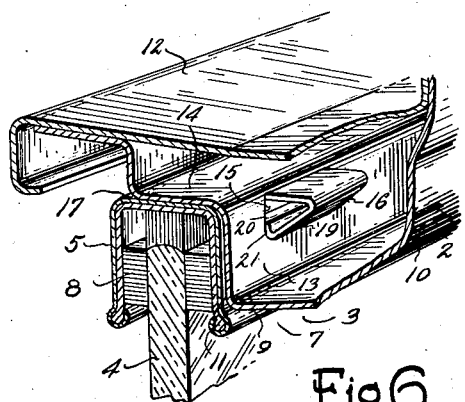
Fig. 6 is a fragmentary perspective showing the window guide channel secured in the window opening.
Figure 5:
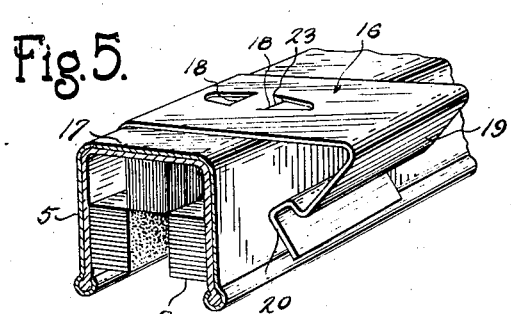
Fig. 5 is a perspective view of a portion of the window guide channel and attaching clip.

It will be noted, as particularly shown in Figs. 2 and 3, that as the U glass run is slid into the window opening the clips and the base of the glass run channel slide along the side wall 14 of the rabbet which assists in guiding the spring clips 16 into the openings 15.

We claim:

1. In a vehicle body, a frame defining a window opening arranged to be closed by a window panel, said frame having a rabbeted portion including an outer wall, a run for the window panel in the form of a channel having a base and side walls, one or more spring clips for said channel, each of said clips comprising a flat portion secured to the base of the window channel and projecting beyond the outer side wall of the channel toward the outside of the body and having a return bent portion terminating in a hook, one or more openings in the outer wall of the rabbet, the said glass run channel being positioned in the rabbet and the projecting portions of the clips passed through the openings in the side wall of the rabbet to interengage the clips and the frame for securing the glass run in the frame by movement of the channel outwardly of the body.

2. In a vehicle body, an outer metal panel having an opening therein and provided with a rabbeted portion along the top and side walls of the opening, a plurality of spaced openings in the outer wall of the said rabbeted portion of the panel, a glass run in the form of a U member of channel section having leg portions extending along the sides of the window openings and a portion extending along the top of the window opening, and a plurality of spring clips secured to the glass run channel in spaced relation, each of said clips comprising a flat portion fixed to the base of the glass run channel and projecting beyond the outer side wall of the channel toward the outside of the body and terminating in a return bent portion extending toward the outer side wall of the channel, the return bent portion having a hook whereby the U glass run channel can be inserted in the rabbeted portion by motion solely outwardly of the vehicle body to pass the clips through the opening in the rabbeted portion of the outer panel and interengage the hooked portion of the clip with the edge of the opening.

EMORY GLENN SIMPSON.
JAMES L. CONLON.